UNITED STATES PATENT OFFICE.

GEORGE NAUTON, HENRI NAUTON, AND GUSTAVE DE MARSAC, OF ST.-OUEN, SEINE, AND THEODORE FRANÇOIS TESSE, OF PARIS, FRANCE.

PROCESS FOR THE MANUFACTURE OF SOLUBLE SOLVENTS.

983,751.

Specification of Letters Patent.

Patented Feb. 7, 1911.

Application filed June 25, 1909. Serial No. 504,261.

No Drawing.

are heated in an enameled basin and brought to a temperature of 50°; there is then added all at once, while stirring well, the lukewarm and very concentrated solution of 11 kilograms of caustic potash, or 8 kilograms of caustic soda. The temperature of the mixture rises abruptly to 75° C. and it is then heated to 90° C. at which temperature it is maintained for two hours. It is then withdrawn from the fire, the temperature allowed to drop to about 70° and then 40 kilograms of perchlorethylene are added. The mass thickens but should not exhibit any turbidity. Water at 50° C. is then added in quantity sufficient to bring the total weight of the product to 200 kilograms. A solution is thus obtained which is alkaline but without free alkali and contains 20% of chlorinated hydrocarbon. The product thus obtained is soluble in water in a clear and limpid manner in all proportions. The solution becomes turbid and milky when the concentration of this latter is less than 1% of chlorinated hydrocarbon or 5% of the solvent product. Above this figure the solution remains stable for a very long time.

The proportion of 11 kilograms of potassium mentioned above may vary slightly, i. e., may be more or less, but the above figure is the one which gives the best result. If the proportion be allowed to fall considerably below this figure, products are obtained which have no stability and which precipitate rapidly.

The products obtained with potassium are more stable than those obtained with sodium.

In the case of hydrocarbons other than perchlorethylene, the temperature at which the hydrocarbon is incorporated varies according to the boiling point of the hydrocarbon.

The new products are capable of very varied applications. They may serve for the cleaning and degreasing of cloth and wool, for removing the suint or fat from wool, for the preparation of non-caustic liquors, for the preparation of liquids for cleaning and restoring old paintings, for the preparation of non-caustic soaps serving to clean objects and the hands when soiled with grease or cart grease.

The indications given are by way of example only; all the details of preparation of the new products may vary in all the cases without changing the principle of the invention.

Claims:

1. The herein described process for the manufacture of limpid solvents completely soluble in water, which consists in sulfonating in the cold castor oil, by conducting the sulfonation so that the sulfonated oil may be capable of absorbing 12 to 12.5% of potash, in mixing the sulfonated oil with a quantity of 10.5 to 11.5% of alkali, in adding a chlorinated hydrocarbon derived from ethylene and in diluting with water so that the proportions of chlorinated hydrocarbon shall not exceed 20% of the final product.

2. The herein described process for the manufacture of limpid solvents completely soluble in water, which consists in sulfonating in the cold castor oil, by conducting the sulfonation so that the sulfonated oil may be capable of absorbing 12 to 12.5% of potash, in heating to 50° C., in adding a quantity of 10.5 to 11.5% of alkali, in heating to a temperature not exceeding 100° C., then cooling to 70° C., and adding a chlorinated hydrocarbon derived from ethylene, and in diluting with water so that the proportions of chlorinated hydrocarbon shall not exceed 20% of the final product.

The foregoing specification of our improvements in or relating to alkaline solvents and the process of manufacture thereof signed by us this 12th day of June, 1909.

GEORGES NAUTON.
HENRI NAUTON.
GUSTAVE DE MARSAC.
THEODORE FRANÇOIS TESSE.

Witnesses:
  H. C. COXE,
  R. EHIRIDT.